(12) United States Patent
Hirano et al.

(10) Patent No.: US 8,559,347 B2
(45) Date of Patent: Oct. 15, 2013

(54) METHOD AND APPARATUS FOR INTERMITTENT COMMUNICATION

(75) Inventors: Jun Hirano, Kanagawa (JP); Takashi Aramaki, Kanagawa (JP); Kazunori Inogai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 236 days.

(21) Appl. No.: 13/030,938

(22) Filed: Feb. 18, 2011

(65) Prior Publication Data

US 2011/0134787 A1     Jun. 9, 2011

Related U.S. Application Data

(63) Continuation of application No. 10/517,521, filed as application No. PCT/JP03/03789 on Mar. 27, 2003, now Pat. No. 7,916,674.

(51) Int. Cl.
    *G08C 17/00*     (2006.01)
(52) U.S. Cl.
    USPC ........................................................ 370/311
(58) Field of Classification Search
    USPC .................. 370/347, 311, 218, 219, 220
    See application file for complete search history.

(56) References Cited

U.S. PATENT DOCUMENTS

| | | | |
|---|---|---|---|
| 4,926,421 A | 5/1990 | Kawano | |
| 5,627,882 A | 5/1997 | Chien | |
| 5,722,065 A | 2/1998 | Ito | |
| 5,819,184 A * | 10/1998 | Cashman | 455/553.1 |
| 5,914,796 A * | 6/1999 | Selin | 398/118 |
| 5,940,771 A | 8/1999 | Gollnick | |
| 6,236,674 B1 | 5/2001 | Morelli | |
| 6,285,662 B1 * | 9/2001 | Watanabe et al. | 370/280 |
| 6,545,999 B1 | 4/2003 | Sugita | |
| 6,556,576 B1 | 4/2003 | Du | |
| 6,804,503 B2 | 10/2004 | Shohara | |
| 6,807,235 B2 | 10/2004 | Yano | |
| 6,965,400 B1 * | 11/2005 | Haba et al. | 348/222.1 |
| 7,185,256 B2 * | 2/2007 | Miki et al. | 714/751 |
| 7,269,145 B2 * | 9/2007 | Koo et al. | 370/311 |
| 7,502,818 B2 | 3/2009 | Kohno | |

FOREIGN PATENT DOCUMENTS

| | | |
|---|---|---|
| EP | 0615364 | 9/1994 |
| JP | 01245728 | 9/1989 |
| JP | 05075528 | 3/1993 |
| JP | 06350508 | 12/1994 |
| JP | 07066766 | 3/1995 |
| JP | 07058688 | 9/1995 |

(Continued)

OTHER PUBLICATIONS

J. Stine, "Improving Energy Efficiency of Centrally Controlled Wireless Data Networks," Wireless Networks, XP001144558, vol. 8, No. 6, Nov. 2002, pp. 681-700.

(Continued)

*Primary Examiner* — Mark Rinehart
*Assistant Examiner* — Mohammad Anwar
(74) *Attorney, Agent, or Firm* — Dickinson Wright PLLC

(57) ABSTRACT

When an intermittent communication mode is entered, a check period and intermittent reception mode period thereof are determined and the intermittent reception mode is reentered through an ignored process, that is, when the intermittent reception mode is entered, the check period and intermittent reception mode period are determined in overhead 101 thereof and data 102, 103 is transmitted/received thereafter through an ignored process.

9 Claims, 6 Drawing Sheets

(56) References Cited

FOREIGN PATENT DOCUMENTS

| JP | 08251097 | 9/1996 |
|----|----------|--------|
| JP | 09083425 | 3/1997 |
| JP | 10510961 | 10/1998 |
| JP | 11266254 | 9/1999 |
| JP | 2001-223634 | 8/2001 |
| WO | 9619084 | 6/1996 |
| WO | 01/03451 | 1/2001 |

OTHER PUBLICATIONS

PCT International Search Report dated Jun. 24, 2003.
K. Miyazu; "Technology Kaitai Shinsho Bluetooth Gijutsu Kaisetsu Guide," Kabushiki Kaisha Ric Telecom, Jun. 11, 2001, pp. 170-173.
ETSI TS 101 761-2 V1.1.1 (Apr. 2000); Broadband Radio Access Networks (BRAN); HIPERLAN Type 2; Data Link Control (DLC) layer; Part 2: Radio Link Control (RLC) sublayer, pp. 90-96.
ARIB; "Lower Power Data Communication Systems Broadband Mobile Access Communication System (HiSWANa)," ARIB STD-T70, pp. 223-230.
Japanese Office Action dated Aug. 15, 2006 with English translation.
ETSI TS 101 761-2 v1.2.1 (Apr. 2001), Technical Specification, Broadband Radio Access Networks (BRAN): HIPERLAN Type 2; Data Link Control (DLC) Layer; Part 2: Radio Link Control (RLC) Sublayer, cover page and pp. 94-99, Apr. 2001).
Japanese Office Action dated Mar. 20, 2007 with English translation.
Japanese Office Action, dated Jan. 19, 2010.
European Search Report dated Jun. 7, 2010.
"Draft Supplement to Standard For Telecommunications and Information Exchange Between Systems—LAN/MAN Specific Requirements—Part 11: Wireless Medium Access Control (MAC) and Physical Layer (PHY) specifications: Medium Access Control (MAC) Enhancements for Quality of Service (QoS)" IEEE Std 802.11 e/D4.2, Draft Supplement to IEEE Std 802.11,1999 Edition, Feb. 2003, XP002582695, pp. i-vi and 1-127.
Extended European Search Report dated Aug. 3, 2012.

\* cited by examiner

US 8,559,347 B2

METHOD AND APPARATUS FOR INTERMITTENT COMMUNICATION

This is a continuation application of application Ser. No. 10/517,521 filed Dec. 13, 2004, which is a national stage of PCT/JP2003/003789 filed Mar. 27, 2003, which is based on Japanese Application No. 2001-305740 filed Oct. 1, 2001, the entire contents of each which are incorporated by reference herein.

TECHNICAL FIELD

The present invention relates to an intermittent communication on a wireless LAN (local area network).

BACKGROUND ART

In a wireless LAN communication, a sleep mode may be used to reduce power consumption of a communication terminal. This technology is defined in ETSI TS 101 761-2 [5.2.6] (HiperLAN2) and ARM STD-T70 [6.2.2.4] (HiSWANa).

More specifically, as shown in FIG. 1, before a sleep mode is entered, a communication terminal apparatus (MT) sends a sleep request to a communication terminal accommodation apparatus (AP) first. In response to the sleep request, the AP checks with the MT to see whether or not to start the sleep mode. After receiving a confirmation of the sleep mode from the AP, the MT enters the sleep mode.

In the sleep mode, there are periods during which the MT checks a BCH (broadcast channel) and the MT checks the BCH at this timing and when there is uplink or downlink data, the MT returns from the sleep mode to a normal mode and transmits/receives data. When there is no more data again, the MT enters the sleep mode using the above described procedure as required.

As in the case of an Internet telephone, when an application extends over not so wide a band and has isochronous data to be transmitted periodically, it is possible to achieve power saving by entering a sleep mode. As shown in FIG. 2, if a procedure such as a sleep request and confirmation is carried out every time, overhead 1101 necessary for the procedure increases, which causes a problem that the efficiency of power saving deteriorates due to the sleep mode and the next data communication starts before the sleep procedure is taken, thus preventing the sleep mode from being actually entered in the worst case.

DISCLOSURE OF INVENTION

It is an object of the present invention to provide an intermittent communication method and intermittent communication apparatus capable of reducing the rate of overhead necessary for a sleep mode starting procedure and improving the efficiency of power saving.

This object can be attained by setting a check period before entering an intermittent communication mode and once the intermittent communication mode is entered, transmitting/receiving data for the set period without taking a normal intermittent communication procedure and thereby reducing the rate of the overhead necessary for the intermittent communication procedure.

BEST MODE FOR CARRYING OUT THE INVENTION

Figure 1:
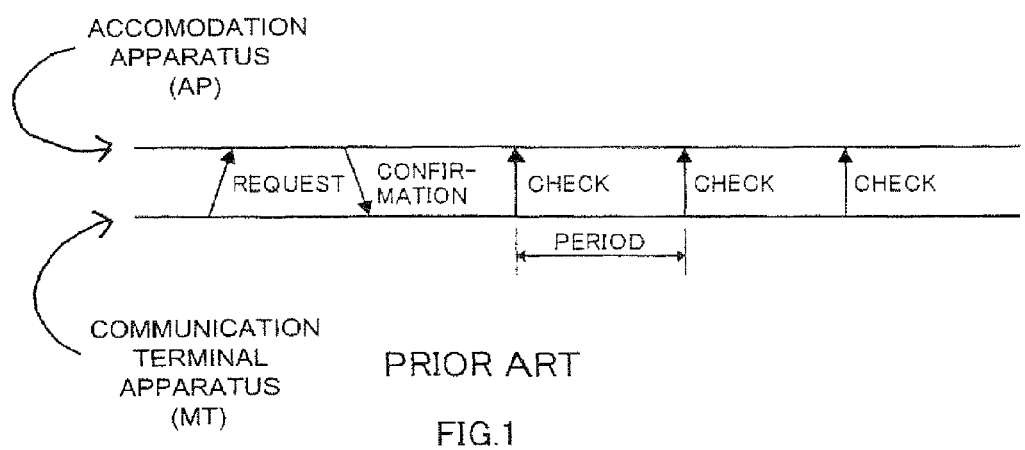
FIG. 1 illustrates an intermittent communication method.
Figure 2:
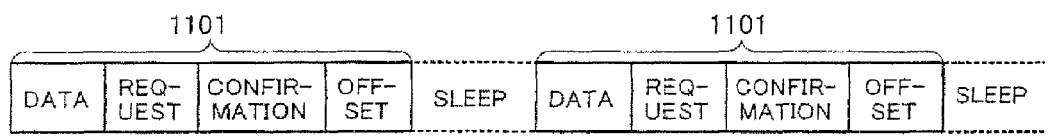
FIG. 2 illustrates a frame format according to a conventional intermittent communication method.
Figure 3:
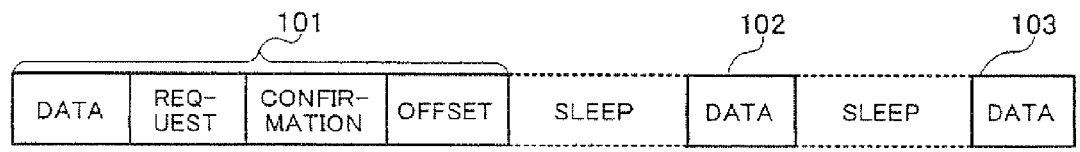
FIG. 3 illustrates a frame format of an intermittent communication method according to the present invention.

The present inventor et al. have noticed that as the count of a procedure for entering a sleep mode a plurality of times consecutively increases, the rate of an overhead portion necessary for the procedure increases and the efficiency of power saving thereby deteriorates. Then, the present inventor et al. have come up with the present invention by discovering that it is possible to improve the efficiency of power saving by determining the check period and sleep mode period before entering a sleep mode and reentering the sleep mode through an ignored process, that is, as shown in FIG. 3, by determining a frame in which a data communication is carried out for the check period and the intermittent communication mode period in the overhead 101 when the sleep mode is entered, and then communicating data 102,103 only in the frame in which the data communication is carried out through an ignored process.

The conventional sleep mode is a mode on standby until a communication becomes necessary when there is no data to be communicated. This requirement is based on a precondition that a sleep mode is entered one time in principle. The present invention is intended to realize continuous sleep (intermittent communication) by improving part of this requirement.

With reference now to the attached drawings, embodiments of the present invention will be explained in detail below.

Embodiment 1

Figure 4:
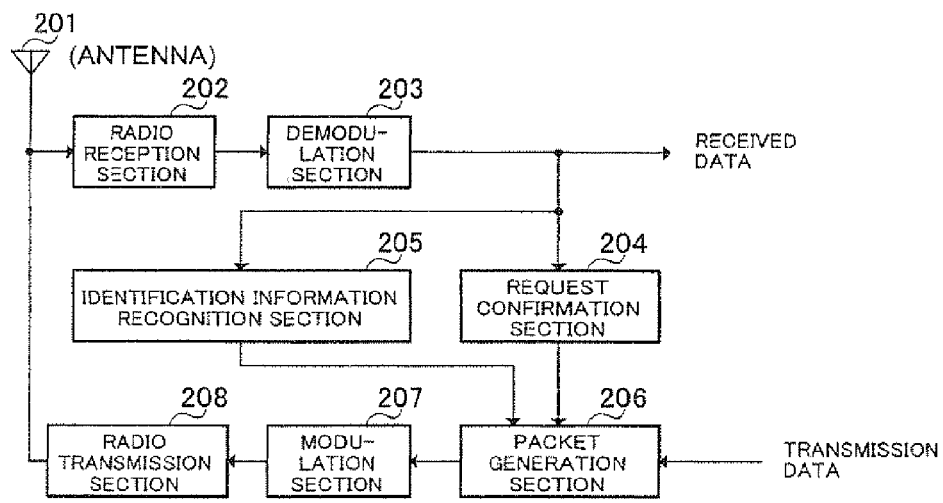
FIG. 4 is a block diagram showing a configuration of a communication terminal accommodation apparatus carrying out an intermittent communication method according to Embodiment 1 of the present invention.

FIG. 4 is a block diagram showing a configuration of a communication terminal accommodation apparatus (AP) carrying out an intermittent communication method according to Embodiment 1 of the present invention.

An uplink signal transmitted from an MT is received by a radio reception section 202 through an antenna 201. The radio reception section 202 carries out predetermined radio reception processing (down-conversion and A/D conversion, etc.) on the uplink signal and outputs the signal subjected to the radio reception processing to a demodulation section 203.

The demodulation section 203 performs demodulation processing on the signal subjected to the radio reception processing and outputs received data. Furthermore, the received data from the demodulation section 203 is output to a request confirmation section 204 and an identification information recognition section 205.

In response to an intermittent communication request sent from the MT, the request confirmation section 204 outputs a confirmation signal (result as to whether or not to accept the transition to the intermittent communication mode) to a packet generation section 206.

The identification information recognition section 205 recognizes identification information included in the intermittent communication request signal from the MT, that is, information on a check period or intermittent communication mode period, and frame information (number of frames, etc.) for carrying out a data communication and outputs this information on a check period or intermittent communication mode period, and frame information (number of frames, etc.) for carrying out a data communication to the packet generation section 206.

The packet generation section 206 inserts the confirmation signal into the intermittent communication request, generates a transmission packet and generates a transmission packet using transmission data. In this case, if the apparatus is in the intermittent communication mode, the packet generation section 206 generates a transmission packet according to the check period and intermittent communication mode period, and frame information (number of frames, etc.) for carrying out a data communication included in the identification information. Furthermore, the packet generation section 206 outputs the transmission packet to a modulation section 207.

The modulation section 207 performs modulation processing on the transmission packet and outputs the modulated signal to a radio transmission section 208. The radio transmission section 208 carries out predetermined radio transmission processing (D/A conversion and up-conversion, etc.) on the modulated signal and sends the signal subjected to the radio transmission processing to the MT through the antenna 201 as a downlink signal.

Figure 5:
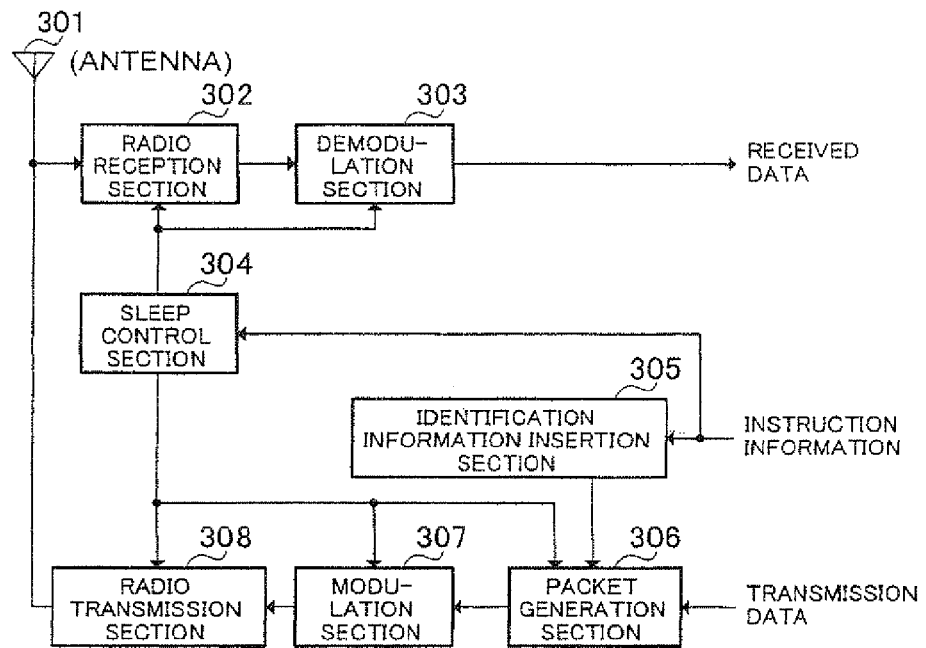
FIG. 5 is a block diagram showing a configuration of a communication terminal apparatus carrying out an intermittent communication method according to Embodiment 1 of the present invention.

FIG. 5 is a block diagram showing a configuration of a communication terminal apparatus (MT) carrying out an intermittent communication method according to Embodiment 1 of the present invention.

A downlink signal sent from the AP is received by a radio reception section 302 through an antenna 301. The radio reception section 302 carries out predetermined radio reception processing (down-conversion and A/D conversion, etc.) on the downlink signal and outputs the signal subjected to the radio reception processing to a demodulation section 303.

The demodulation section 303 carries out demodulation processing on the signal subjected to the radio reception processing and outputs received data. An identification information insertion section 305 outputs identification information indicating a check period in the intermittent communication mode and intermittent communication mode period, and frame information (number of frames, etc.) for carrying out a data communication to a packet generation section 306 based on, for example, the instruction information from a higher layer.

A sleep control section 304 exercises control of stopping the operations of the radio reception section 302, demodulation section 303, packet generation section 306, modulation section 307 and radio transmission section 308 according to the identification information indicating a check period in the intermittent communication mode and intermittent communication mode period, and frame information (number of frames, etc.) for carrying out a data communication based on, for example, the instruction information from a higher layer.

The packet generation section 306 inserts the identification information which is information on a check period in the intermittent communication mode and intermittent communication mode period, and frame information (number of frames, etc.) for carrying out a data communication into transmission data and generates a transmission packet. In this case, if the apparatus is in the intermittent communication mode, the packet generation section 306 generates a transmission packet according to the check period and intermittent communication mode period, and frame information (number of frames, etc.) for carrying out a data communication included in the identification information. Furthermore, the packet generation section 306 outputs the transmission packet to the modulation section 307.

The modulation section 307 carries out modulation processing on the transmission packet and outputs the modulated signal to the radio transmission section 308. The radio transmission section 308 carries out predetermined radio transmission processing (D/A conversion and up-conversion, etc.) on the modulated signal and sends the signal subjected to the radio transmission processing to the MT through the antenna 301 as a downlink signal.

The case where the intermittent communication of the present invention is carried out by the communication terminal accommodation apparatus and communication terminal apparatus in the above described configuration will be explained.

First, the MT requests the AP to enter an intermittent communication mode. More specifically, the identification information insertion section 305 outputs the identification information which is information on a check period and intermittent communication mode period, and frame information (number of frames, etc.) for carrying out a data communication to the packet generation section 306 and the packet generation section 306 inserts the identification information into the transmission data (intermittent communication request signal) and generates a transmission packet. Thus, the MT sends the transmission packet including the identification information to the AP as an intermittent communication request signal.

After demodulating the intermittent communication request signal from the MT, the AP checks the signal with the request confirmation section 204 and outputs a confirmation signal either accepting or not accepting the intermittent communication request to the packet generation section 206.

Furthermore, the identification information recognition section 205 recognizes the identification information included in the demodulated intermittent communication request signal, that is, the check period in the intermittent communication mode, intermittent communication mode period, and frame information (number of frames, etc.) for carrying out a data communication and outputs the information to the packet generation section 206.

The packet generation section 206 generates a transmission packet using a signal as to whether or not to accept the intermittent communication request which is a confirmation signal. The AP sends the transmission packet generated in this way to the MT as a confirmation signal in response to the intermittent communication request.

The operations explained so far correspond to transmission/reception of the overhead 101 portion shown in FIG. 3 and the intermittent communication mode according to the present invention becomes effective hereafter.

In the intermittent communication mode, using the sleep control section 304 the MT exercises control of stopping the operations of the radio reception section 302, demodulation section 303, packet generation section 306, modulation section 307 and radio transmission section 308 during the sleep period shown in FIG. 3. Furthermore, the sleep control section 304 checks the BCH based on the check period and controls, when there is data, transmission/reception of the data. At this time, the sleep control section 304 does not transmit/receive an intermittent communication request signal or confirmation signal as in the conventional case and checks the BCH using only a predetermined frame through an ignored process. The sleep control section 304 performs such control over the intermittent communication mode period.

Furthermore, the intermittent communication period preferably matches the same frame period as that of MAC broadcast. By matching the same frame period as that of MAC (sub) broadcast in the sleep mode with the intermittent communication period, it is possible to receive broadcast data taking advantage of the intermittent communication.

In this way, in the intermittent communication of the present invention, the procedure in the intermittent communication mode is carried out first, and from then on intermittent communications are carried out over an intermittent communication mode period by checking the BCH (data communication) using only a specific frame for a predetermined check period through an ignored process. This avoids the necessity for carrying out a sleep starting procedure every time, and can thereby reduce the number of times intermittent communication request signals and confirmation signals necessary for the intermittent communication mode procedure are transmitted/received. As a result, it is possible to prevent deterioration in the efficiency of power saving due to overhead in the intermittent communication mode procedure.

More specifically, when a system whose one frame consists of 2 ms is applied to a speech communication, if 256 bits are assigned at a time, it is only necessary to perform transmission one time with two frames at 64 kbps, and therefore it is possible to use a time half that in a normal case for a sleep. Furthermore, in a 12 fps image communication, there are 1/12 sec=83 msec approximately 42 frames, and therefore considering that a sleep takes place at 2^n periods, it is only necessary to check every 32 frames, which results in considerable power saving.

Here, the identification information will be explained. The above described explanation refers to the case where the identification information is information on a check period in an intermittent communication mode and an intermittent communication mode period. Other examples of the identification information of the present invention include (1) a bit indicating that a check is made at each check period followed by a sleep, (2) information indicating that there is a specified period different from a check period or a period for carrying out transmission/reception of data, (3) information on a predetermined frame when the BCH is checked at a check period followed by transmission/reception of data corresponding to the predetermined frame, (4) information on the specified period in (2) and the predetermined frame in (3).

Especially, the mode in which data corresponding to the predetermined frame is transmitted/received after a check as with (3) is preferable in the case where the amount of data is increased/decreased by the user's operation as in the ease of Web access. Furthermore, it is also possible to cheek a normal intermittent communication mode and check period in the intermittent communication mode of the present invention, provide the check period with a meaning and notify the check period as identification information to thereby distinguish between the check period in the normal intermittent communication mode and check period in the intermittent communication mode of the present invention. In this case, it is possible to reduce the amount of identification information to be notified.

Furthermore, considering the necessity for checking a control channel (BCH) or other broadcast data, the intermittent communication period preferably matches the period of the MAC broadcast frame. Furthermore, the identification information according to the intermittent communication method of the present invention preferably includes information on the number of frames used for communications. Assignment is normally performed once at X-frame periods, and therefore the number of frames need not be exchanged, but by adding information on the number of necessary frames, it is possible to perform assignment Y times at X-frame periods. This allows an intermittent communication when there are restrictions on communication resources that can be occupied in one-frame period or an intermittent communication with Ack.

The foregoing description refers to the case where identification information is inserted into an intermittent communication request signal from the MT, but according to the present invention it is also possible to insert identification information into a confirmation signal from the AP. This case will be explained below.

Figure 6:
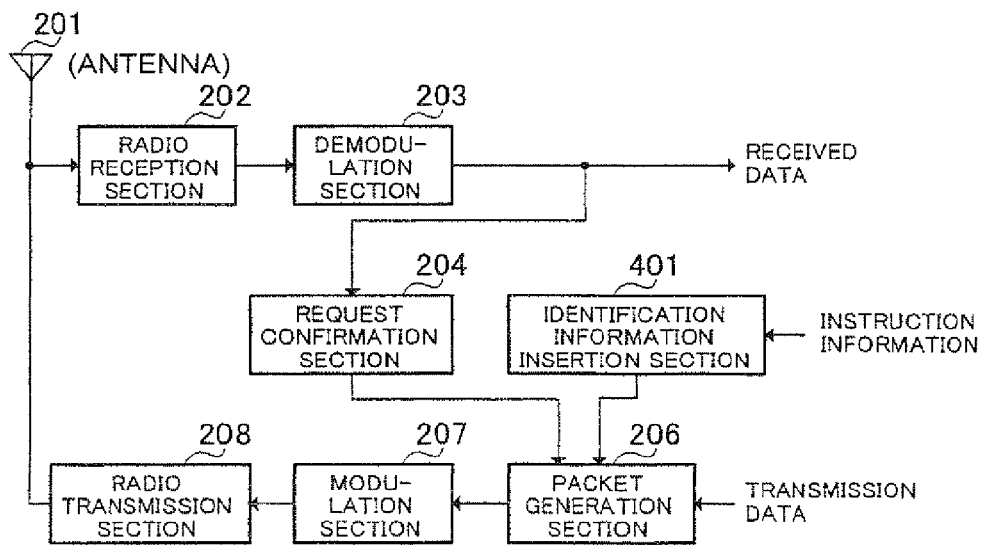
FIG. 6 is a block diagram showing another configuration of the communication terminal accommodation apparatus carrying out an intermittent communication method according to Embodiment 1 of the present invention.

FIG. 6 is a block diagram showing another configuration of the communication terminal accommodation apparatus (AP) carrying out the intermittent communication method according to Embodiment 1 of the present invention. In FIG. 6, the same components as those in FIG. 4 are assigned the same reference numerals as those in FIG. 4 and detailed explanations thereof will be omitted.

The communication terminal accommodation apparatus shown in FIG. 6 is provided with an identification information insertion section 401 instead of the identification information recognition section 205. The identification information insertion section 401 outputs identification information indicating a check period in an intermittent communication mode, intermittent communication mode period, and frame information (number of frames, etc.) for carrying out a data communication to a packet generation section 206 based on, for example, instruction information from a higher layer.

The packet generation section 206 uses a signal as to whether or not to accept an intermittent communication request which is a confirmation signal and inserts identification information which is information on a check period in an intermittent communication mode and intermittent communication mode period, and frame information (number of frames, etc.) for carrying out a data communication into transmission data and generates a transmission packet.

Figure 7:
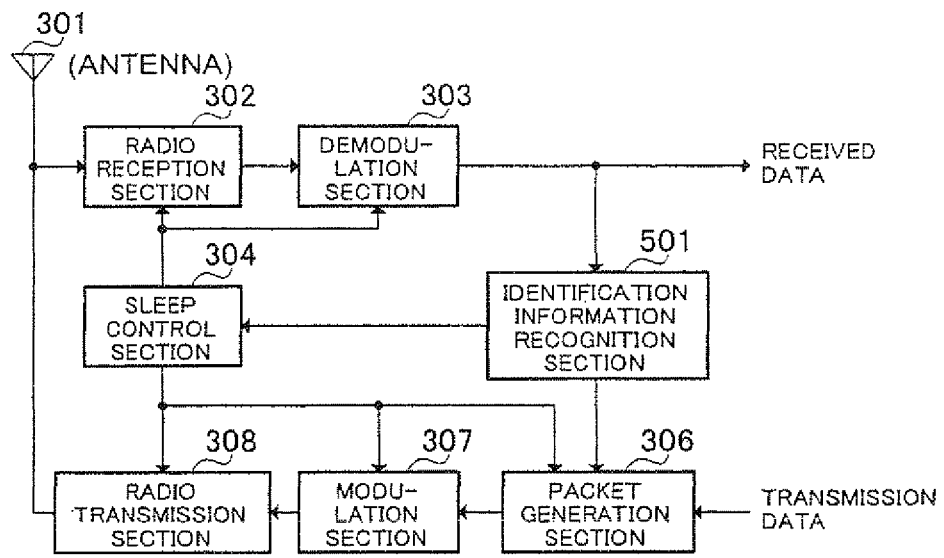
FIG. 7 is a block diagram showing another configuration of the communication terminal apparatus carrying out an intermittent communication method according to Embodiment 1 of the present invention.

FIG. 7 is a block diagram showing another configuration of the communication terminal apparatus (MT) carrying out the intermittent communication method according to Embodiment 1 of the present invention. In FIG. 7, the same components as those in FIG. 5 are assigned the same reference numerals as those in FIG. 5 and detailed explanations thereof will be omitted.

The communication terminal apparatus shown in FIG. 7 is provided with an identification information recognition section 501 instead of the identification information insertion section 305. The identification information recognition section 501 recognizes identification information included in a confirmation signal from the AP, that is, information on a check period and intermittent communication mode period, and frame information (number of frames, etc.) for carrying out a data communication and outputs the information on this check period and intermittent communication mode period, and frame information (number of frames, etc.) for carrying out a data communication to a sleep control section 304 and packet generation section 306.

In an intermittent communication mode, the packet generation section 306 generates a transmission packet according to the check period and intermittent communication mode period, and frame information (number of frames, etc.) for carrying out a data communication included in the identification information. Furthermore, the sleep control section 304 performs sleep control according to the identification information.

The case where the intermittent communication of the present invention is carried out using the communication terminal accommodation apparatus and communication terminal apparatus in the above described configurations will be explained.

First, the MT requests the AP to enter an intermittent communication mode. That is, the MT sends the transmission packet generated at the packet generation section 306 to the AP as an intermittent communication request signal.

After demodulating the intermittent communication request signal from the MT, the request confirmation section 204 of the AP checks the request signal and outputs a signal as to whether or not to accept the intermittent communication request to the packet generation section 206.

The packet generation section 206 generates a transmission packet using a signal either accepting or not accepting the intermittent communication request. Furthermore, the identification information insertion section 401 outputs identification information which is information on the check period and intermittent communication mode period, and frame information (number of frames, etc.) for carrying out a data communication to the packet generation section 206 according to the instruction information from a higher layer indicating that the intermittent communication mode should be entered and the packet generation section 206 inserts identification information into the confirmation signal to generate a transmission packet. The AP sends the transmission packet generated in this way to the MT as a confirmation signal in response to the intermittent communication request.

The identification information recognition section 501 of the MT recognizes identification information included in the demodulated confirmation signal, that is, the check period in the intermittent communication mode, intermittent communication mode period, and frame information (number of frames, etc.) for carrying out a data communication and outputs the information to the sleep control section 304 and packet generation section 306.

The operations explained so far correspond to transmission/reception of the overhead 101 portion shown in FIG. 3 and the intermittent communication mode of the present invention becomes effective hereafter.

In the intermittent communication mode, the sleep control section 304 of the MT exercises control of stopping the operations of the radio reception section 302, demodulation section 303, packet generation section 306, modulation section 307 and radio transmission section 308 during the sleep period shown in FIG. 3. Furthermore, the sleep control section 304 checks the BCH based on the check period and controls, when there is data, transmission/reception of the data. At this time, the sleep control section 304 performs no transmission/reception of the intermittent communication request signal or confirmation signal as in the conventional case and performs a BCH check through an ignored process. The sleep control section 304 exercises such control over the intermittent communication mode period.

In this way, also when the identification information is inserted into the confirmation signal sent from the AP to the MT, the procedure in the intermittent communication mode is carried out first, and from then on intermittent communications are carried out over an intermittent communication mode period by only checking the BCH for a predetermined cheek period through an ignored process. This eliminates the necessity for carrying out the sleep starting procedure every time, and can thereby reduce the number of times intermittent communication request signals necessary for the intermittent communication mode procedure and confirmation signals are transmitted/received. As a result, it is possible to prevent deterioration in the efficiency of power saving due to overhead in the intermittent communication mode procedure.

Embodiment 2

This embodiment will describe a case where control channels (e.g., BCH) are not checked either in the intermittent communication mode of the present invention within a range in which synchronization can be maintained. In this case, the intermittent communication mode period according to this embodiment needs to be set to a period shorter than a maximum allowable synchronization holding time. In this way, the MT even need not check the BCH and can perform power saving more efficiently through an intermittent communication.

In this case, when synchronization can no longer be held due to factors such as disturbance even within the maximum allowable synchronization holding time, it is necessary to return to a normal mode and reset the intermittent communication mode period. Such a case will be explained below.

Figure 8:
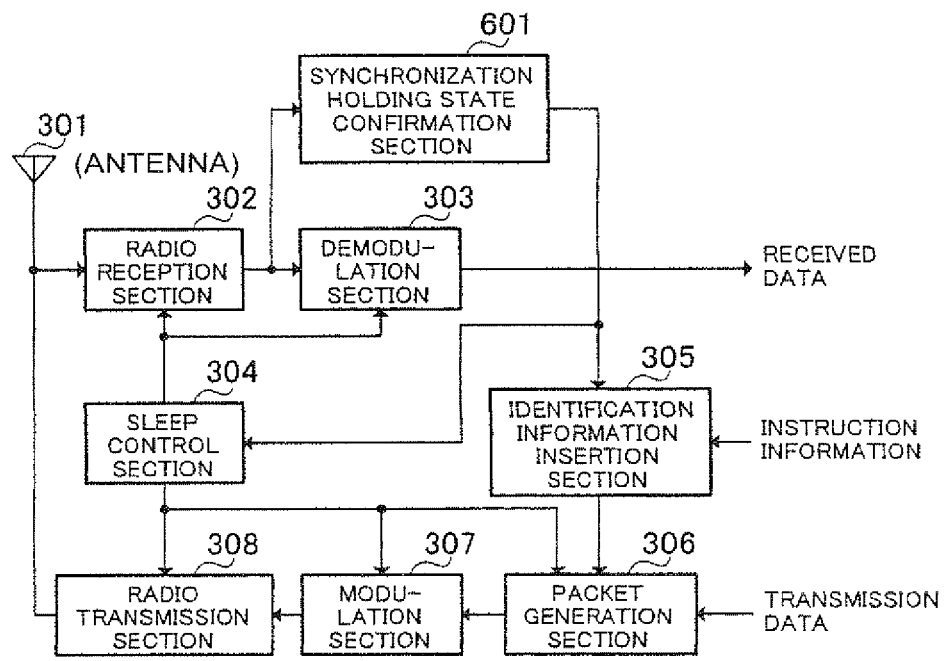
FIG. 8 is a block diagram showing a configuration of a communication terminal apparatus carrying out an intermittent communication method according to Embodiment 2 of the present invention.

FIG. 8 is a block diagram showing a configuration of a communication terminal apparatus carrying out an intermittent communication method according to Embodiment 2 of the present invention. In FIG. 8, the same components as those in FIG. 5 are assigned the same reference numerals as those in FIG. 5 and detailed explanations thereof will be omitted.

The communication terminal apparatus shown in FIG. 8 is provided with a synchronization holding state confirmation section 601 that checks to see whether synchronization can be held or not. This synchronization holding state confirmation section 601 checks whether synchronization of the MT can be held or not based on a received signal and outputs the confirmation result (e.g., information that a synchronization holding state can no longer be held) to an identification information insertion section 305 and a sleep control section 304. The synchronization holding state can be checked using a known method.

In the intermittent communication mode according to this embodiment, the BCH which is a control channel is not checked, and only data is transmitted/received periodically at specified periods. At this time, the synchronization holding state confirmation section 601 checks the synchronization holding state using the received signal. When it is decided that the synchronization holding state cannot be held, the synchronization holding state confirmation section 601 outputs a control signal indicating the fact to the identification information insertion section 305 and sleep control section 304.

The sleep control section 304 selects the normal intermittent communication mode according to the control signal indicating that the synchronization holding state cannot be held and performs sleep control in the intermittent communication mode. Furthermore, the identification information insertion section 305 resets the intermittent communication mode period according to the control signal indicating that the synchronization holding state cannot be held and outputs the intermittent communication mode period to the packet generation section 306 as identification information.

The subsequent processing is the same as that in Embodiment 1 described above.

Thus, according to this embodiment, the MT even need not check the BCH and can perform power saving through an intermittent communication efficiently. Furthermore, even if the synchronization holding state cannot be held, it is possible to reset the intermittent communication mode period and carry out an intermittent communication of the present invention.

In the above described explanations, the intermittent communication mode period is set to a period shorter than a maximum allowable synchronization holding time, but in the case where the intermittent communication mode period is longer than the maximum allowable synchronization holding time, it is preferable to receive a control channel signal for correcting the state out of synchronization with the AP periodically and correct the out-of-synchronization state based on the control channel signal for correcting the out-of-synchronization state. This makes it possible to realize an intermittent communication according to the present invention irrespective of the maximum allowable synchronization holding time.

Furthermore, in the intermittent communication mode period, it is preferable for the MT to receive a control channel signal for periodically checking the control of the AP. When the AP desires to change a parameter of an intermittent communication, the MT checks it periodically, and can thereby flexibly respond to variations in the traffic situation, etc. The effects are especially large when control channels and broadcast data are not received.

Embodiment 3

This embodiment will describe a case where identification information such as a check period is reset when traffic increases in the intermittent communication mode of the present invention.

Figure 9:
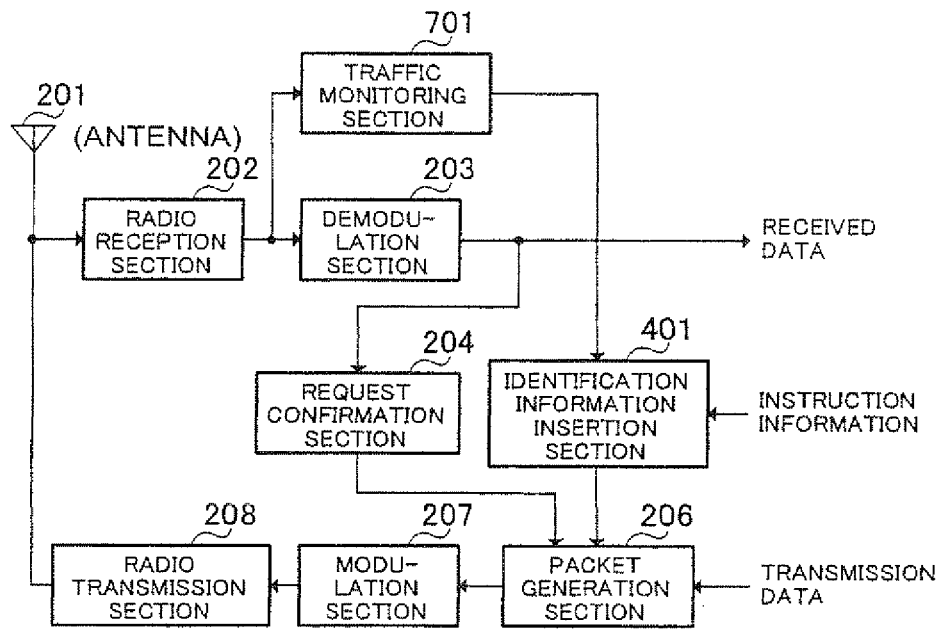
FIG. 9 is a block diagram showing a configuration of a communication terminal accommodation apparatus carrying out an intermittent communication method according to Embodiment 3 of the present invention.

FIG. 9 is a block diagram showing a configuration of a communication terminal accommodation apparatus carrying out an intermittent communication method according to Embodiment 3 of the present invention. In FIG. 9, the same components as those in FIG. 6 are assigned the same reference numerals as those in FIG. 6 and detailed explanations thereof will be omitted.

The communication terminal accommodation apparatus shown in FIG. 9 is provided with a traffic monitoring section 701 that monitors the traffic congestion state. This traffic monitoring section 701 monitors whether traffic is busy or not based on a received signal and outputs a control signal indicating that identification information such as a check period should be reset to an identification information insertion section 401. Here, traffic can be monitored using a known method.

In the intermittent communication mode of this embodiment, the traffic monitoring section 701 monitors traffic using a received signal. When the traffic monitoring section 701 decides that it is necessary to reset identification information such as the check period because of an increase in traffic, the traffic monitoring section 701 outputs a control signal indicating the information to the identification information insertion section 401.

The identification information insertion section 401 resets identification information such as a check period according to the control signal indicating that the identification information needs to be reset and outputs the identification information to the packet generation section 206.

The subsequent processing is the same as that in Embodiment 1.

As shown above, this embodiment can perform power saving using an intermittent communication even when traffic increases.

Embodiment 4

This embodiment will describe a case where the period of an intermittent communication is set to once every $2^n$ frames (n: natural number) and an intermittent communication is carried out by bringing together applications (services) with a plurality of periods and in a form including all the corresponding periods.

Figure 10:
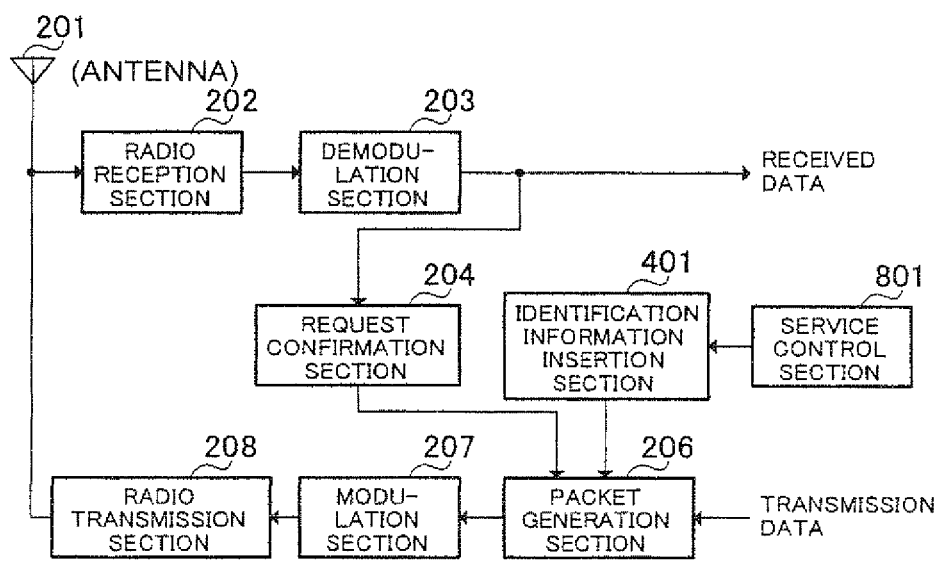
FIG. 10 is a block diagram showing a configuration of a communication terminal accommodation apparatus carrying out an intermittent communication method according to Embodiment 4 of the present invention.

FIG. 10 is a block diagram showing a configuration of a communication terminal accommodation apparatus carrying out an intermittent communication method according to Embodiment 4 of the present invention. In FIG. 10, the same components as those in FIG. 6 are assigned the same reference numerals as those in FIG. 6 and detailed explanations thereof will be omitted.

The communication terminal accommodation apparatus shown in FIG. 10 is provided with a service control section 801 that controls a plurality of applications (services). The service control section 801 controls identification information such as the respective check periods, etc. of the plurality of services #1 to #n (e.g., speech, keyboard, image (mpeg), etc.) and outputs the identification information to an identification information insertion section 401. The identification information insertion section 401 associates the identification information on the check period, etc. determined by the service control section 801 with each MT and outputs the identification information to a packet generation section 206.

The subsequent processing is the same as that in Embodiment 1.

Figure 11:
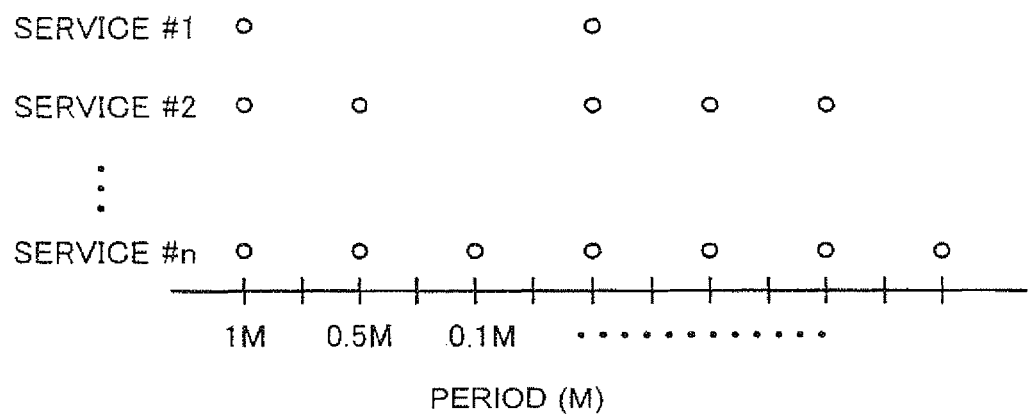
FIG. 11 illustrates an intermittent communication method according to Embodiment 4 of the present invention.

When the MT sleeps based on the identification information determined by the service control section 801, the MT has a check period of a pattern as shown in FIG. 11. In FIG. 11, white bullets denote timings at which the MT checks. The pattern shown in FIG. 11 can be expressed by representing the value of n of $2^n$ which is a synchronization parameter using a bit string.

According to this embodiment, even when a plurality of services is handled in a communication, it is possible to efficiently cause each MT to sleep and efficiently carry out an intermittent communication, and the AP can also be associated with each MT using $2^n$, and therefore it is possible to realize an efficient communication.

Embodiment 5

This embodiment will describe a case where retransmissions are enabled. When a plurality of frames is available, an intermittent communication according to this embodiment realizes an ARQ (Automatic Repeat Request) by securing Ack/Nack frames, automatically adding, when the AP sends Nack, a frame for retransmission and carrying out communications continuously.

Thus, according to this embodiment, it is possible to enable retransmissions in an intermittent communication mode, prevent a standby state until the next timing of intermittent communication before it is too late, and immediately communicate using the next frame and increase data which can be rescued by retransmissions. As a result, it is possible to reduce the probability of discarding packets and improve the transmission efficiency. This embodiment is particularly effective for Web access, etc.

The present invention is not limited to above described Embodiments 1 to 5 but can be implemented modified in various ways. Furthermore, Embodiments 1 to 5 can also be combined as appropriate. For example, it is also possible to construct a radio communication system using the communication terminal apparatus and communication terminal accommodation apparatus in the above described explanations.

Furthermore, the above described intermittent communication method can also be constructed by software. That is, the intermittent communication method can be constructed of an intermittent communication program that causes an computer to execute a step of transmitting identification information including an intermittent communication period and frame information for carrying out a data communication together with an intermittent communication request from a communication terminal apparatus to a communication terminal accommodation apparatus, a step of the communication terminal accommodation apparatus transmitting a confirmation signal of the intermittent communication request to the communication terminal apparatus, a step of the communication terminal apparatus entering an intermittent communication mode, when the communication terminal apparatus receives the confirmation signal and carrying out a data communication only using the frame for carrying out the data communication in the intermittent communication mode, or constructed of an intermittent communication program that causes an computer to execute a step of transmitting an intermittent communication request from the communication terminal apparatus to the communication terminal accommodation apparatus, a step of the communication terminal accommodation apparatus transmitting a confirmation signal of the intermittent communication request together with identification information including an intermittent communication period and frame information for carrying out a data communication to the communication terminal apparatus and a step of the communication terminal apparatus entering the intermittent communication mode when the communication terminal apparatus receives the confirmation signal and carrying out a data communication only using the frame for carrying out the data communication in the intermittent communication mode. In this case, it is also possible to achieve effects similar to those when the intermittent communication method is implemented by hardware.

As described above, the intermittent communication method and intermittent communication apparatus of the present invention are applicable to a communication terminal apparatus and communication terminal accommodation apparatus in a radio communication.

The intermittent communication method of the present invention comprises a step of transmitting identification information including an intermittent communication period and frame information for carrying out a data communication together with an intermittent communication request from a communication terminal apparatus to a communication terminal accommodation apparatus, a step of the communication terminal accommodation apparatus transmitting a confirmation signal of the intermittent communication request to the communication terminal apparatus and a step of the communication terminal apparatus entering an intermittent communication mode when the communication terminal apparatus receives the confirmation signal and carrying out a data communication using only the frame for carrying out the data communication in the intermittent communication mode.

According to this method, a check period is preset before entering the intermittent communication mode, and once the intermittent communication mode is entered, data is transmitted/received with a predetermined frame in the set period without a normal intermittent communication procedure, and therefore it is possible to reduce the rate of overhead necessary for the intermittent communication procedure and improve the efficiency of power saving through the intermittent communication.

The intermittent communication method of the present invention comprises a step of transmitting an intermittent communication request from a communication terminal apparatus to a communication terminal accommodation apparatus, a step of the communication terminal accommodation apparatus transmitting a confirmation signal of the intermittent communication request together with identification information including an intermittent communication period and frame information for carrying out a data communication to the communication terminal apparatus and a step of the communication terminal apparatus entering an intermittent communication mode when the communication terminal apparatus receives the confirmation signal and carrying out a data communication with only the frame carrying out the data communication in the intermittent communication mode.

According to this method, when an intermittent communication mode is entered, a check period is preset and once the intermittent communication mode is entered, data is transmitted/received with a predetermined frame in the set period without any normal intermittent communication procedure, and therefore it is possible to reduce the rate of overhead necessary for the intermittent communication procedure and improve the efficiency of power saving through an intermittent communication.

In the intermittent communication method of the present invention, the identification information includes information on the number of frames used for a communication.

Assignment is normally performed once at X-frame periods, and therefore the number of frames need not be exchanged, but by adding information on the number of necessary frames, it is possible to perform assignment Y times X-frame periods. This allows an intermittent communication when there are restrictions on the communication resources that can be occupied in one-frame period or an intermittent communication with Ack for an ARQ which comes later.

In the intermittent communication method of the present invention, the intermittent communication period matches the period of the same frame as that of MAC broadcast.

According to this method, matching the same frame as that of MAC (sub) broadcast in a sleep mode with the intermittent communication period makes it possible to also receive broadcast data while carrying out an intermittent communication.

The intermittent communication method of the present invention is characterized in that the communication terminal apparatus does not receive any control channel signal in a data communication in the intermittent communication mode.

The intermittent communication method of the present invention is characterized in that the intermittent communication mode period is shorter than a maximum allowable synchronization holding time of the communication terminal apparatus.

According to these methods, even the control channel need not be checked, making it possible to perform power saving through an intermittent communication more efficiently.

The intermittent communication method of the present invention is characterized in that when the intermittent communication mode period is longer than the maximum allowable synchronization holding time, the communication terminal apparatus receives a control channel signal to correct an out-of-synchronization state.

According to these methods, it is possible to realize an intermittent communication avoiding a control channel check whenever possible irrespective of the maximum allowable synchronization holding time.

The intermittent communication method of the present invention is characterized in that the communication terminal apparatus receives a control channel signal for periodically checking the control of the communication terminal accommodation apparatus in the intermittent communication mode period.

According to this method, when the communication terminal accommodation apparatus desires to change an intermittent communication parameter, the communication terminal apparatus checks the parameter periodically, and can thereby flexibly respond to variations in the traffic situation, etc. Effects are large especially when no control channel or broadcast data is received.

In the intermittent communication method of the present invention, a retransmission frame is added when the communication terminal apparatus receives a Nack signal from the communication terminal accommodation apparatus.

According to this method, it is possible to enable retransmissions in the intermittent communication mode, suppress an increase in the delay caused by standby until the next timing of intermittent communication and immediately communicate using the next frame and increase data that can be rescued by retransmissions. As a result, it is possible to reduce the probability of discarding packets and improve the transmission efficiency.

The intermittent communication method of the present invention is characterized in that the intermittent communication period is set to once every $2^n$ frames (n: natural number) and an intermittent communication is performed by patterning applications with a plurality of periods.

According to this method, even when a plurality of applications (services) is handled in a communication, it is possible to efficiently cause each communication terminal apparatus to sleep, efficiently carry out an intermittent communication, also allow the communication terminal accommodation apparatus to respond to each communication terminal apparatus once every $2^n$ frames and thereby perform a communication efficiently.

The communication terminal apparatus of the present invention comprises an intermittent communication apparatus provided with an identification information insertion section that inserts identification information including an intermittent communication period and frame information for carrying out a data communication into transmission data and a control section that performs control, when a confirmation signal in response to an intermittent communication request is received from the communication terminal accommodation apparatus, in such a way that the data communication is carried out based on the intermittent communication period and frame information for carrying out a data communication using only the frame for carrying out the data communication.

According to this configuration, a check period is preset before entering an intermittent communication mode, and once the intermittent communication mode is entered, data is transmitted/received with a predetermined frame in the set period without a normal sleep starting procedure, and therefore it is possible to reduce the rate of overhead necessary for the intermittent communication procedure and improve the efficiency of power saving through an intermittent communication.

The communication terminal accommodation apparatus of the present invention comprises a reception section that receives an intermittent communication request from the communication terminal apparatus, a transmission section that transmits a confirmation signal of the intermittent communication request and identification information including an intermittent communication period and frame information for carrying out a data communication to the communication terminal apparatus and a control section that carries out a data communication, when the communication terminal apparatus enters an intermittent communication mode, using only the frame for carrying out the data communication in the intermittent communication mode.

According to this configuration, a check period is preset before entering an intermittent communication mode, and once the intermittent communication mode is entered, data is transmitted/received with a predetermined frame in the set period without a normal sleep starting procedure, and therefore it is possible to reduce the rate of overhead necessary for the intermittent communication procedure and improve the efficiency of power saving through an intermittent communication.

The radio communication system of the present invention is a radio communication system comprising a plurality of communication terminal apparatuses and a communication terminal accommodation apparatus that accommodates these communication terminal apparatuses, wherein the communication terminal apparatus comprises an intermittent communication apparatus provided with an identification information insertion section that inserts an intermittent communication period and identification information including frame information for carrying out a data communication into transmission data and a control section that controls for carrying out a data communication, when a confirmation signal response to an intermittent communication request is received from the communication terminal accommodation apparatus, using only the frame for carrying out the data communication based on the intermittent communication period and frame information for carrying out a data communication, and the communication terminal accommodation apparatus comprises an intermittent communication apparatus provided with a reception section that receives an intermittent communication request from the communication terminal apparatus, a transmission section that transmits a confirmation signal of the intermittent communication request together with identification information including an intermittent communication period and frame information for carrying out a data communication and a control section that carries out a data communication, when the communication terminal apparatus enters an intermittent communication mode, using only the frame for carrying out the data communication in the intermittent communication mode.

According to this configuration, a check period is preset before entering an intermittent communication mode, and once the intermittent communication mode is entered, data is transmitted/received with a predetermined frame in the set period without a normal sleep starting procedure, and therefore it is possible to reduce the rate of overhead necessary for the intermittent communication procedure and improve the efficiency of power saving through an intermittent communication.

The intermittent communication program of the present invention is to cause a computer to execute a step of transmitting identification information including an intermittent communication period and frame information for carrying out a data communication together with an intermittent communication request from a communication terminal apparatus to a communication terminal accommodation apparatus, a step of the communication terminal accommodation apparatus transmitting a confirmation signal of the intermittent communication request to the communication terminal apparatus and a step of the communication terminal apparatus entering an intermittent communication mode when the communication terminal apparatus receives the confirmation signal and carrying out the data communication using only the frame for carrying out the data communication in the intermittent communication mode.

According to this program, a check period is preset before entering an intermittent communication mode, and once the intermittent communication mode is entered, data is transmitted/received with a predetermined frame in the set period without a normal sleep starting procedure, and therefore it is possible to reduce the rate of overhead necessary for the intermittent communication procedure and improve the efficiency of power saving through an intermittent communication.

The intermittent communication program of the present invention is to cause a computer to execute a step of transmitting an intermittent communication request from a communication terminal apparatus to a communication terminal accommodation apparatus, a step of the communication terminal accommodation apparatus transmitting a confirmation signal of the intermittent communication request together with identification information including an intermittent communication period and frame information for carrying out a data communication to the communication terminal apparatus and a step of the communication terminal apparatus entering an intermittent communication mode when the communication terminal apparatus receives the confirmation signal and carrying out a data communication using only the frame for carrying out the data communication in the intermittent communication mode.

According to this program, a check period is preset before entering an intermittent communication mode, and once the intermittent communication mode is entered, data is transmitted/received with a predetermined frame in the set period without a normal sleep starting procedure, and therefore it is possible to reduce the rate of overhead necessary for the intermittent communication procedure and improve the efficiency of power saving through an intermittent communication.

As described above, according to the present invention, a check period is preset before entering an intermittent communication mode, and once the intermittent communication mode is entered, data is transmitted/received with a predetermined frame in the set period without a normal sleep starting procedure, and therefore it is possible to reduce the rate of overhead necessary for the intermittent communication procedure and improve the efficiency of power saving through an intermittent communication.

This application is based on the Japanese patent application No. 2001-305740 filed on Oct. 1, 2001, entire content of which is expressly incorporated by reference herein.

INDUSTRIAL APPLICABILITY

The present invention is preferably applicable to a wireless LAN (local area network).

The invention claimed is:

1. An intermittent communication method performed by a communication terminal, comprising:
   receiving, from an access point, a configuration signal to configure the communication terminal to operate in an intermittent communication mode comprising a sleep period; and
   monitoring intermittently a control channel in accordance with a configuration of the intermittent communication mode, the configuration being set according to the configuration signal, wherein:
   upon the communication terminal receiving, from the access point, a NACK signal relating to a new transmission in an automatic repeat request mode, regardless of whether the communication terminal is presently monitoring the control channel or not, the communication terminal receives an ACK/NACK signal from the access point for a retransmission of the new transmission, wherein:
   the communication terminal secures an ACK/NACK frame for receiving the ACK/NACK signal for the retransmission.

2. The method according to claim 1, wherein the configuration signal includes information for indicating a monitoring period in the intermittent communication mode.

3. The method according to claim 1, wherein the control channel is a broadcast channel (BCH).

4. A communication terminal, comprising:
   a radio reception section configured to receive from an access point a configuration signal to configure the communication terminal to operate in an intermittent communication mode comprising a sleep period; and
   a control section configured to monitor intermittently a control channel in accordance with a configuration of the intermittent communication mode, the configuration being set according to the configuration signal,
   wherein:
   upon the communication terminal receiving from the access point, a NACK signal relating to a new transmission in an automatic repeat request mode, regardless of whether the communication terminal is presently monitoring the control channel or not the communication terminal receives an ACK/NACK signal from the access point for a retransmission of the new transmission, wherein:
   the communication terminal secures an ACK/NACK frame for receiving the ACK/NACK signal for the retransmission.

5. The communication terminal according to claim 4, wherein the configuration signal includes information for indicating a monitoring period in the intermittent communication mode.

6. The communication terminal according to claim 4, wherein the control channel is a broadcast channel (BCH).

7. An access point, comprising:
   a transmission section configured to:
   transmit a configuration signal to a communication terminal to configure the communication terminal to operate in an intermittent communication mode in which the communication terminal monitors intermittently a control channel in accordance with a configuration of the intermittent communication mode, the configuration being set according to the configuration signal and the intermittent communication mode comprising a sleep period, transmit a NACK signal to the communication terminal relating to a new transmission in an automatic repeat request mode, and transmit an ACK/NACK signal to the communication terminal for a retransmission of the new transmission, wherein the ACK/NACK signal is received by the communication terminal regardless of whether the communication terminal is presently monitoring the control channel or not, wherein:

the communication terminal secures an ACK/NACK frame for receiving the ACK/NACK signal for the retransmission.

8. The access point according to claim 7, wherein the configuration signal includes information for indicating a monitoring period in the intermittent communication mode.

9. The access point according to claim 7, wherein the control channel is a broadcast channel (BCH).

* * * * *